United States Patent

[19]

Schedrovitsky et al.

[11] 4,156,192

[45] May 22, 1979

[54] INDUCTIVE DISPLACEMENT TRANSDUCER USING PLURAL MAGNETIC SCREENS ROTATABLE ABOUT DIFFERENT AXIS TO MODIFY AN INDUCTANCE PROPORTIONAL TO THE DISPLACEMENT

[75] Inventors: Savely S. Schedrovitsky; Dmitry M. Mash; Zoya I. Golovko; Agnia A. Belyaeva; Jury M. Dubrovin, all of Moscow; Nikolai I. Shindin, Kishinev, all of U.S.S.R.

[73] Assignee: Moskovskoe Nauchno-Proizvodstvennoe Obiedinenie Po Stroitelstvu I Dorozhnomu Mashinostroeniju, Moscow, U.S.S.R.

[21] Appl. No.: 823,759

[22] Filed: Aug. 11, 1977

[51] Int. Cl.² ........................................... G01R 33/12
[52] U.S. Cl. .................................. 324/208; 310/111;
336/87; 336/135; 340/196; 323/51
[58] Field of Search .............. 324/34 R, 34 D, 34 PS,
324/34 O, 207, 208; 310/111; 323/51; 336/75,
77, 79, 84, 87, 132, 134, 135; 340/196

[56] References Cited

U.S. PATENT DOCUMENTS

| | | | |
|---|---|---|---|
| 1,558,473 | 10/1925 | Gordon | 336/79 |
| 2,388,049 | 10/1945 | Goode | 336/87 |
| 3,105,212 | 9/1963 | Schwartz | 323/51 |
| 3,219,956 | 11/1965 | Newell et al. | 323/51 |
| 3,297,940 | 1/1967 | Mulligan et al. | 340/196 |

*Primary Examiner*—Robert J. Corcoran
*Attorney, Agent, or Firm*—J. Harold Nissen

[57] ABSTRACT

An inductive transducer intended, according to the invention, for converting the displacement of mechanical objects into an electric signal, comprising primary and secondary coils with cores, connected to one of mutually moving mechanical objects. The coils are arranged one opposite the other with a gap, wherein a main screen connected to the other moving object and at least one auxiliary screen are located. The auxiliary screen is set movably in a plane parallel to the main screen. The inductive transducer of this invention permits obtaining a functional relationship between the output signal and two or more displacements of mechanical objects, and thereby enables the relationship, including the slope thereof, to be controlled by simple means.

9 Claims, 6 Drawing Figures

INDUCTIVE DISPLACEMENT TRANSDUCER USING PLURAL MAGNETIC SCREENS ROTATABLE ABOUT DIFFERENT AXIS TO MODIFY AN INDUCTANCE PROPORTIONAL TO THE DISPLACEMENT

The present invention relates to instrument-making industry, and more particularly to inductive transducers.

The present invention can most advantageously be used in devices, the measurand whereof, such as force, torque, acceleration, etc., is converted into various types of displacement.

The nature of a displacement representative of the measurand, and especially the nature of a displacement determining the parameter to be controlled, i.e., presetting the value of a parameter in a measuring or automatic system, is more often than not rather complex. In addition, a parameter of a particular instrument may require readjustment and in some cases two or more parameters having different coefficients of correlation must or may produce a common output signal. These problems involve the use of sophisticated equipment. This invention is therefore aimed at solving the above problems by the use of noncontact functional displacement transducers which comply with the latest requirements to the design of highly reliable instruments.

Known in the art are inductive transducers which convert displacement into electric signals, comprising a field coil, a measuring coil, and a magnetic screen. The coils change the mutual inductance during movement of the screen, made as a metal plate, linked to a member sensitive to variations in force, torque or other parameters. The primary coil (or coils, connected, for instance, in a differential circuit) is connected to a high-frequency oscillator, and the secondary coil (or coils) is connected to a detector and to an indicator. The inductively-coupled coils are separated by an air gap.

The output signal in the prior-art inductive transducers depends on the distance covered by the magnetic screen as it moves in the air gap between the coils, and is a function of a single parameter being measured.

Another known inductive transducer is essentially a shaped diamagnetic screen coupled to one of mutually moving members and are placed in an air gap between two parallel brackets mounting ferromagnetic cores which accommodate induction coils. The brackets are linked with the other one of the mutually moving members. The primary coils located on one bracket are included in a high-frequency oscillator circuit. The AC voltage of the primary coils induces a voltage in the secondary coils disposed on the other bracket, with the induced voltage amplitude being a function of the measured displacement of the screen. Variations in the measurand, accompanied by mutual displacements of the screen and coils, result in variations in the ratio between the screened areas of the coils, hence, in the transformation factor of the coils, whereby the output coil voltage departs from the initial value. Thus, mutual movements of the screen and coil magnetic assembly are proportional to the signal at the circuit output.

However, the prior-art inductive transducer fails to provide for a functional relationship between the output signal and two or more displacements, and does not permit modulation of the output signal when required. In addition, the inductive transducer connected circuits with an abruptly varying output signal does not provide for the desired shape (slope) of the output signal because the latter is proportional to the screened coil area which does not change so fast as, for example, the screen profile. Consequently, to shape a desired output signal requires highly complicated equipment.

When functional relationships must be established between the output signal and two or more displacements and when the functional relationships must be manipulated mathematically, a number of prior art inductive transducers are to be used, connected according to the operation to be performed. This measure, however, does not obviate a disadvantage residing in the impossibility of obtaining a rapidly changing output signal.

Besides, when the known inductive transducers are manufactured, aligned and adjusted, a number of cuts are made in the screen for shaping it so as to establish a definite relation between the area of the coils covered by the screen and the amount of travel thereof. Therewith, the design of screens for multifunctional relationships is greatly complicated, and difficulties arise in operation of the transducer readjusted for use in an integrated system.

It is an object of the present invention to provide an inductive transducer providing for functional relationships between an output signal and two or more displacements of mechanical objects and permitting control of the predetermined relationship by simple means.

Another object of this invention is to permit modulation of one input signal by another.

Still another object of the present invention is to cut down labour requirements in the manufacture of an inductive transducer.

With these and other objects in view, an inductive transducer for converting displacements of mechanical objects to electric signals is proposed, comprising primary and secondary coils connected to one of mutually moving mechanical objects, provided with cores arranged opposite each other and separated by a gap wherein a main screen coupled to the other one of the mutually moving objects is arranged, wherein according to the invention, at least one auxiliary screen is set movably in a plane parallel to the main screen and employed together with the latter for providing a predetermined functional relationship between the electric signal and displacements of the mechanical objects.

It is expedient that at least one auxiliary screen be coupled to a respective one of the mutually moving mechanical objects.

It is also expedient that the main screen should be linked to at least one auxiliary screen and to one of the mutually moving mechanical objects for modulating input signals and for steepening the slope of the curve representing the functional relationship, between the output signal and displacements of the mechanical objects.

It is advisable that the main screen and at least one auxiliary screen be composed of superimposed plates adapted to move and be locked relative to each other in a certain position so as to provide for readjustment of the functional relationship in the inductive transducer included in an integrated system.

It is also advisable that the at least one auxiliary screen have a shape different from that of the main screen.

An important advantage of the present invention is that its metrological characteristics are improved, the requirements to incorporation of inductive transducers into the equipment are moderate, and the design thereof is simplified.

These and other objects and advantages of the present invention will become more fully apparent from the following detailed description of a preferred embodiment thereof, taken in conjunction to the accompanying drawings, wherein.

Figure 1:
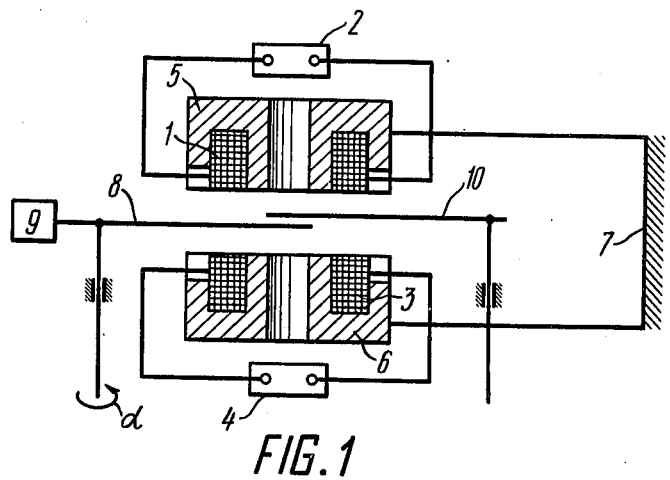
FIG. 1 is a general view of an inductive transducer, according to the invention, used for conversion of displacements of mechanical objects into electric signals.

Referring to FIG. 1, the inductive transducer for converting displacements of mechanical objects into an electric signal comprises a primary coil 1 which forms a supply circuit and is connected to a power source 2 (high-frequency sine-wave oscillator), and a secondary coil 3 which constitutes a measuring circuit and is connected to a measuring instrument 4 in which an output electric signal is produced. The primary coil 1 and the secondary coil 3 are fitted, respectively, into ferromagnetic cores 5 and 6 disposed on one of mutually moving mechanical objects 7. Cores 5 and 6 each have a central leg, and coil 1 is wound about the central leg of coil 5 and coil 3 is wound about the central leg of core 6. The coils 1 and 3 are separated by an air gap accommodating a main screen 8 in the form of a metal plate lying in a plane parallel to that of the coils 1 and 3. The main screen 8 is coupled to the other one 9 of the mutually moving objects and is moved by the latter through, say, an angle $\alpha$, with the working edges of the main screen being shaped according to a predetermined functional relationship between the mutual displacement of the objects 7 and 9 and the output electric signal. Arranged in the air gap between the coils 1 and 3 in parallel to the plate of the main screen 8 is the plate of a secondary screen 10 which constitutes, together with the main screen 8, a common screening surface of the coils 1 and 3.

Figure 2:
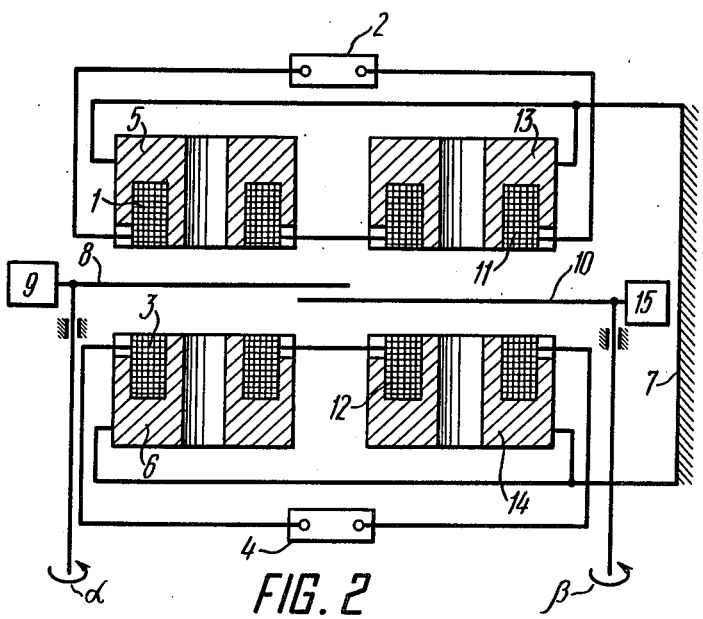
FIG. 2 is a general view of an inductive transducer comprising coils connected in a differential circuit, and screens coupled to different mutually moving mechanical objects, according to the invention.

Turning now to FIG. 2, the inductive transducer comprises two primary coils 1 and 11, and two secondary coils 3 and 12. The primary coils 1 and 11 are placed in series and are connected to a voltage source 2. The secondary coils 3 and 12 are connected in series in a differential circuit. The primary coil 11 and the secondary coil 12 are arranged inside cores 13 and 14 also installed on one of mutually moving mechanical objects 7. The auxiliary screen 10 is linked with a third one (15) of the mutually moving mechanical object and is moved by the latter through, say, an angle $\beta$.

Figure 3:
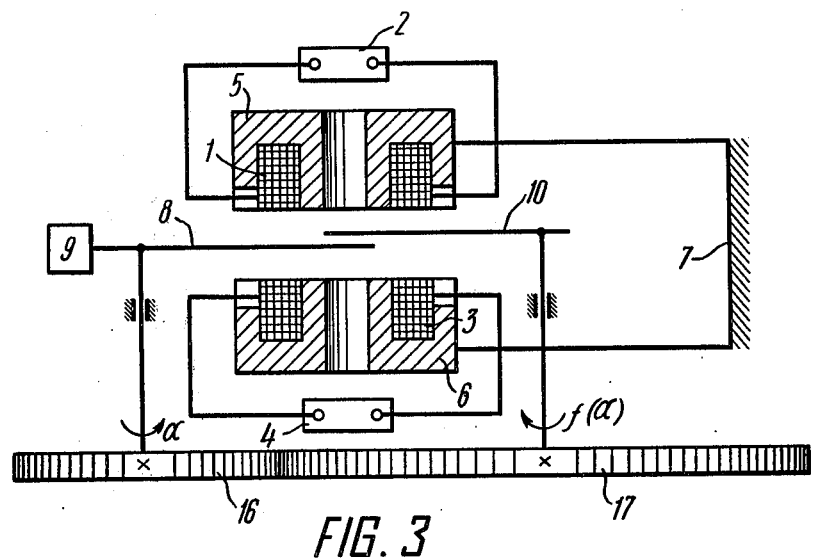
FIG. 3 shows an inductive transducer incorporating an auxiliary screen linked with the main screen, according to the invention.

In the inductive transducer of FIG. 3, the auxiliary screen 10 is linked with the main screen 8, for example, by gears 16 and 17. In this case, the voltage derived at the secondary coil 3 is a function of the displacement of one (9) of the mutually moving objects through, say, an angle $\alpha$, and is a function of that movement $f(\alpha)$ i.e. $U[\alpha; f(\alpha)]$.

Figure 4:
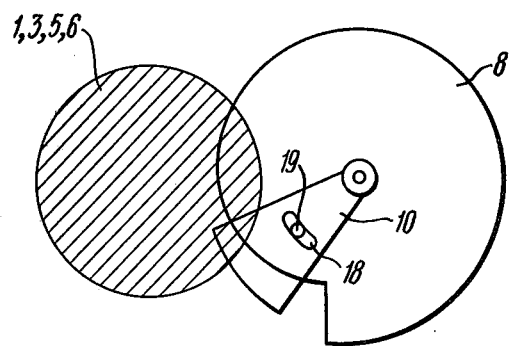
FIG. 4 shows an inductive transducer, the main and auxiliary screens whereof constitute a single composite screen, according to the invention.

FIG. 4 is a schematic plan view of an inductive transducer, wherein the main screen 8 and the auxiliary screen 10 use common guides 18 and a means 19 for locking the screens 8 and 10 in relation to each other, whereby a single composite screen is formed.

Figure 5:
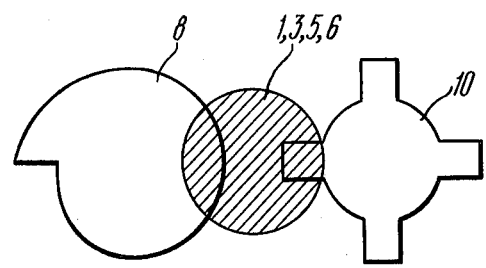
FIG. 5 shows the shape of the main and auxiliary screens in one of the embodiments of the present invention.

FIG. 5 shows another embodiment of the shape and mutual arrangement of the main screen 8 and auxiliary screen 10 in relation to the coils 1 and 3, and to the cores 5 and 6. The screens 8 and 10 are adapted to turn through angles $\alpha$ and $\beta$ according to the mutual arrangement of the mutually moving mechanical objects 7, 9 and 15 (FIG. 2).

Figure 6:
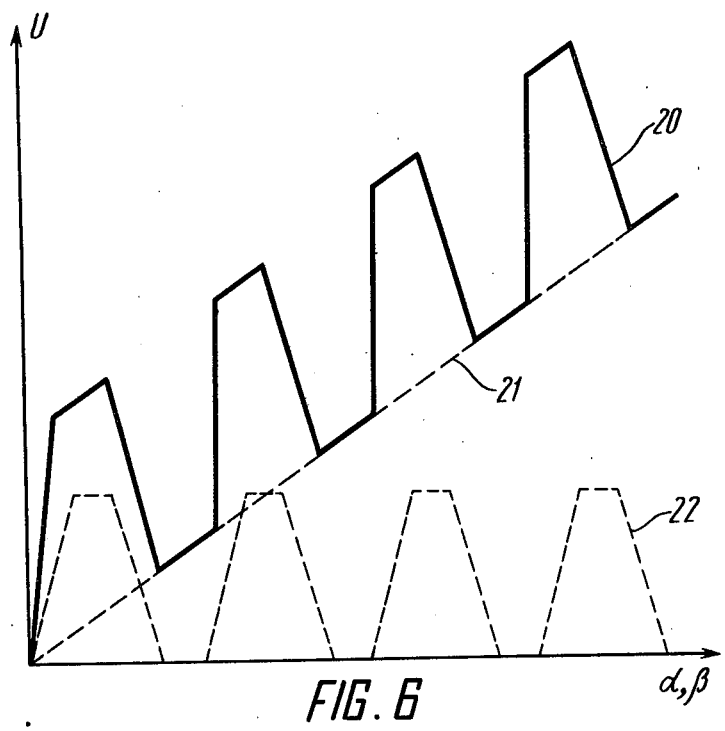
FIG. 6 shows the waveforms of the output of an inductive transducer with screens presented in FIG. 5, according to the invention.

The signal 20 (FIG. 6) across the output of the secondary coil 3 (FIG. 1), the waveforms whereof are presented in FIG. 6, is produced by addition of two electric signals 21 and 22. The electric signal 21 corresponds to the movement of the main screen 8, the electric signal 22 corresponds the movement of the auxiliary screen 10, and the resulting output signal 20 is therefore a function of movements of both screens 8 and 10.

The inductive transducer operates as follows. When a sinewave voltage is applied to the primary coil 1 (FIG. 1) or to the primary coils 1 and 11 (FIG. 2), the secondary coil 3 (FIG. 1) or the secondary coils 3 and 12 (FIG. 2) produce a voltage, the amplitude whereof depends on the area of the primary coils 1 and 11 screened from the secondary coils 3 and 12. A measurand (displacement, force, torque, acceleration, etc.) acting on the object 9, such as a sensitive element of an appropriate sensor of the parameter being measured, causes the object 9 to more together with the main screen 8. The other object 15 moves the auxiliary screen 10, with the result that the screened area of the coils 1, 3, 11 and 12 varies according to the total amount of displacement of the objects 9 and 15. A resulting change in the mutual arrangement of the screens 8 and 10, and coils 1, 3, 11 and 12 brings about a respective change in the interaction of the primary coils 1 and 11, and secondary coils 3 and 12 of the inductive transducer, so that the voltage across the secondary coils 3, and 12, i.e., the output signal 20 (FIG. 6) of the inductive transducer, is varied, too.

Thus, in the inductive transducer comprising the main screen 8 (FIG. 2) and the auxiliary screen 10 shaped as shown in FIG. 5, the output signal 20 (FIG. 6) is a function of displacement of both objects 9 and 15 (FIG. 2) through the angles $\alpha$ and $\beta$ relative to the object 7 coupled with the coils 1, 3, 11 and 12. Obviously, the proposed operating principle permits substitution of the single induction transducer for an intricate circuitry intended for adding the signals 21 and 22 (FIG. 6), and thus simplifies the construction as a whole affecting the performances.

The inductive transducer of the present invention provides a simple means for mutual correlation of the signals 21 and 22 corresponding to the displacements of the objects 9 and 15 (FIG. 2). Thus, if the moving main screen 8 and auxiliary screen 10 do not overlap, respective signals 21 and 22 (FIG. 6) are added. If the screens 8 and 10 (FIG. 5) move toward each other along a horizontal axis, and overlap on reaching definite angles $\alpha$ and $\beta$, the magnitude of mutual correlation between the signals 21 and 22 depends on the amount of overlap of the screens 8 and 10.

In some cases, when a steeper slope of the output signal 20 (FIG. 6) cannot be provided because of the predetermined shape of the main screen 8 (FIG. 5), the auxiliary screen 10 must be linked to the main screen 8. As the screens are moved together by the object 9, the shape of the screened area varies with the turn angle α, and the desired functional relationship between the output signal 20 (FIG. 6) and displacement of the objects 9 and 7 (FIG. 3) can be achieved.

Sometimes, when the above corrective actions must be taken directly in the measuring system to permit adjustment or readjustment of the functional relationship between the output signal 20 (FIG. 6) and mutual displacements of the objects 7, 9 and 15 (FIG. 2) use is made of the auxiliary screen 10 (FIG. 4) (or one of the auxiliary screens) which is movable relative to the main screen 8 along the guides 18, and can be brought to a preset position and locked therein by the means 19. A composite screen thus formed is then driven by one of the mutually moving objects 9 or 15 (FIG. 2).

The air gap between the primary winding 1 (FIG. 1) and secondary winding 3 is made enough, so that uncontrolled (lateral) displacements of the screens 8 and 10 inside the gap do not cause any variation of the output signal 20 (FIG. 6). For shaping the field of the inductively-coupled coils 1 and 3 (FIG. 1), the working edges of the screens 8 and 10 may be given any predetermined shape. The magnetic field is set only around the inductively-coupled coils 1 and 3, and does not influence the other coils (not shown). The magnetic system employed in these transducers permits placing inductively isolated coils to preset positions and provides for their displacement as a result of adjustment of the measuring system and alteration of the characteristics thereof.

What is claimed is:

1. An inductive transducer for converting displacements of at least two mutually moving mechanical objects into electric signals, comprising:
    (a) first and second ferromagnetic cores operatively associated with said at least two mutually moving objects;
    (b) a primary coil associated with said first core and a secondary coil associated with said second core, said primary and said secondary coils and said first and said second cores being spaced from one another and separated from each other by a gap, said first and said second cores being positioned in face to face relationship with each other on opposite sides of said gap;
    (c) a first plate screen movable about a first axis and coupled for movement with one of said mutually moving mechanical objects and between said primary and secondary coils within said gap, said screen screening magnetic flux between said coils;
    (d) at least one additional plate screen movable about a second axis spaced from said first axis and associated with another of said mutually moving mechanical objects and arranged in said gap also to screen magnetic flux between said coils, said first plate screen being movable in a plane parallel to said additional plate screen, and said first plate screen and said additional screen constituting together a common screening surface for said primary and said secondary cores, and
    (e) said primary coil being connected to a source of energy, said secondary coil producing electrical signals in response to energization of said primary coil by said source of energy, said first plate screen causing a variation depending on its position in said gap in the electrical signals produced by said secondary coil, and said additional plate screen also causing a variation in the electrical signals produced by said secondary coil depending upon the position of said additional plate screen in said gap, said additional plate screen being used together with said first plate screen to provide for a predetermined functional relationship between said electric signals and mutual displacement of said mechanical objects.

2. An inductive transducer as claimed in claim 1, wherein at least one said additional plate screen has a shape different from that of said first plate screen.

3. An inductive transducer as claimed in claim 1, wherein said first plate screen and at least one said additional plate screens are made in the form of superimposed plates adapted to be moved and to be locked relative to each other.

4. An inductive transducer as claimed in claim 1, wherein:
    said first ferromagnetic core includes a first primary core member having a first primary coil member and a second primary core member having a second primary coil member, said second ferromagnetic core includes a first secondary core member having a first secondary coil member and a second secondary core member having a second secondary coil member positioned for cooperation with said first primary coil member and said second primary coil member, respectively, and separated from each other to provide said gap between said first primary coil member and first secondary coil member, and said second primary coil member and said second secondary coil member;
    said ferromagnetic cores are linked with a third one of said mutually moving mechanical objects,
    said first plate screen and said at least one of said additional plate screens are made in the form of partially superimposed plates adapted to be moved in directions opposite to each other in an overlapped relationship,
    said first plate screen is movable in said gap between said first primary coil member and said first secondary coil member, and said one additional plate screen is movable in said gap between said second primary coil member and said second secondary coil member and in partial overlapping relationship with said first plate screen.

5. An inductive transducer as claimed in claim 1, wherein:
    said first plate screen and at least one of said additional plate screens are linked with each other and with one of said mutually moving mechanical objects.

6. An inductive transducer as claimed in claim 4, wherein:
    at least one of said additional plate screens has a shape different from that of said first plate screen,
    said first plate screen and said differently shaped one of said additional plate screens are made in the form of superimposed plates adapted to be moved and to be locked relative to each other, and
    locking means including a guide and a preset locking device to lock said first plate screen and said differently shaped additional plate screen together to form a composite screen which can be moved by one of said other of said mutually moving mechanical objects and said respective one of said mutually moving mechanical objects.

7. An inductive transducer as claimed in claim 5, wherein at least one of said additional plate screens has a shape different from that of said first plate screen.

8. An inductive transducer as claimed in claim 5, wherein said first plate screen and at least one of said additional plate screens are made in the form of superimposed plates adapted to be moved and to be locked relative to each other.

9. An inductive transducer as claimed in claim 5, including:

gearing linking said first plate screen and at least one said additional plate screens for relative movement with respect to each other and with respect to said first and said second coils, said gearing rotating said screens in a direction opposite to each other and about said first and said second axes.

* * * * *